(12) United States Patent
Wang et al.

(10) Patent No.: US 11,328,605 B2
(45) Date of Patent: May 10, 2022

(54) ADJUSTABLE BLIND SPOT MONITOR

(71) Applicant: TOYOTA JIDOSHA KABUSHIKI KAISHA, Toyota (JP)

(72) Inventors: Ziran Wang, Mountain View, CA (US); Kyungtae Han, Mountain View, CA (US); BaekGyu Kim, Mountain View, CA (US)

(*) Notice: Subject to any disclaimer, the term of this patent is extended or adjusted under 35 U.S.C. 154(b) by 367 days.

(21) Appl. No.: 16/364,851

(22) Filed: Mar. 26, 2019

(65) Prior Publication Data
US 2020/0312150 A1   Oct. 1, 2020

(51) Int. Cl.
*G08G 1/16* (2006.01)
*B60Q 9/00* (2006.01)

(52) U.S. Cl.
CPC ............ *G08G 1/167* (2013.01); *G08G 1/16* (2013.01); *G08G 1/166* (2013.01); *B60Q 9/008* (2013.01); *B60R 2300/804* (2013.01)

(58) Field of Classification Search
CPC .......... G08G 1/16; G08G 1/163; G08G 1/164; G08G 1/166; G08G 1/167; G09B 29/10; B62D 15/025; B62D 15/0265; B60W 30/0956; B60W 30/00; G05D 1/00; G05D 1/02
See application file for complete search history.

(56) References Cited

U.S. PATENT DOCUMENTS

| | | | |
|---|---|---|---|
| 7,602,276 B2* | 10/2009 | Madau | B60R 1/00 340/435 |
| 8,368,755 B2* | 2/2013 | Nishida | G06K 9/00805 348/148 |
| 9,600,768 B1* | 3/2017 | Ferguson | G06K 9/00791 |
| 10,399,480 B2* | 9/2019 | Kim | B60Q 1/24 |
| 2010/0049393 A1* | 2/2010 | Emam | G08G 1/161 701/31.4 |
| 2015/0350607 A1* | 12/2015 | Kim | H04N 7/181 348/148 |
| 2016/0195615 A1* | 7/2016 | Tobeta | G01S 7/4808 701/70 |
| 2017/0113696 A1* | 4/2017 | Oh | G06K 9/00798 |
| 2018/0023951 A1* | 1/2018 | Seo | G01B 11/275 356/138 |
| 2018/0052457 A1* | 2/2018 | Kim | G05D 1/0055 |

* cited by examiner

*Primary Examiner* — Van T Trieu
(74) *Attorney, Agent, or Firm* — Burbage Law, P.C.; Jon-Michael Burbage

(57) ABSTRACT

The disclosure includes embodiments for adjusting a blind spot monitor on a vehicle to improve safety of the vehicle. In some embodiments, a method for the vehicle includes detecting a change in a heading of the vehicle. The method includes modifying an operation of the blind spot monitor on the vehicle based on the change in the heading of the vehicle so that performance of the blind spot monitor is enhanced to improve safety of the vehicle in a scenario when the vehicle changes the heading.

20 Claims, 12 Drawing Sheets

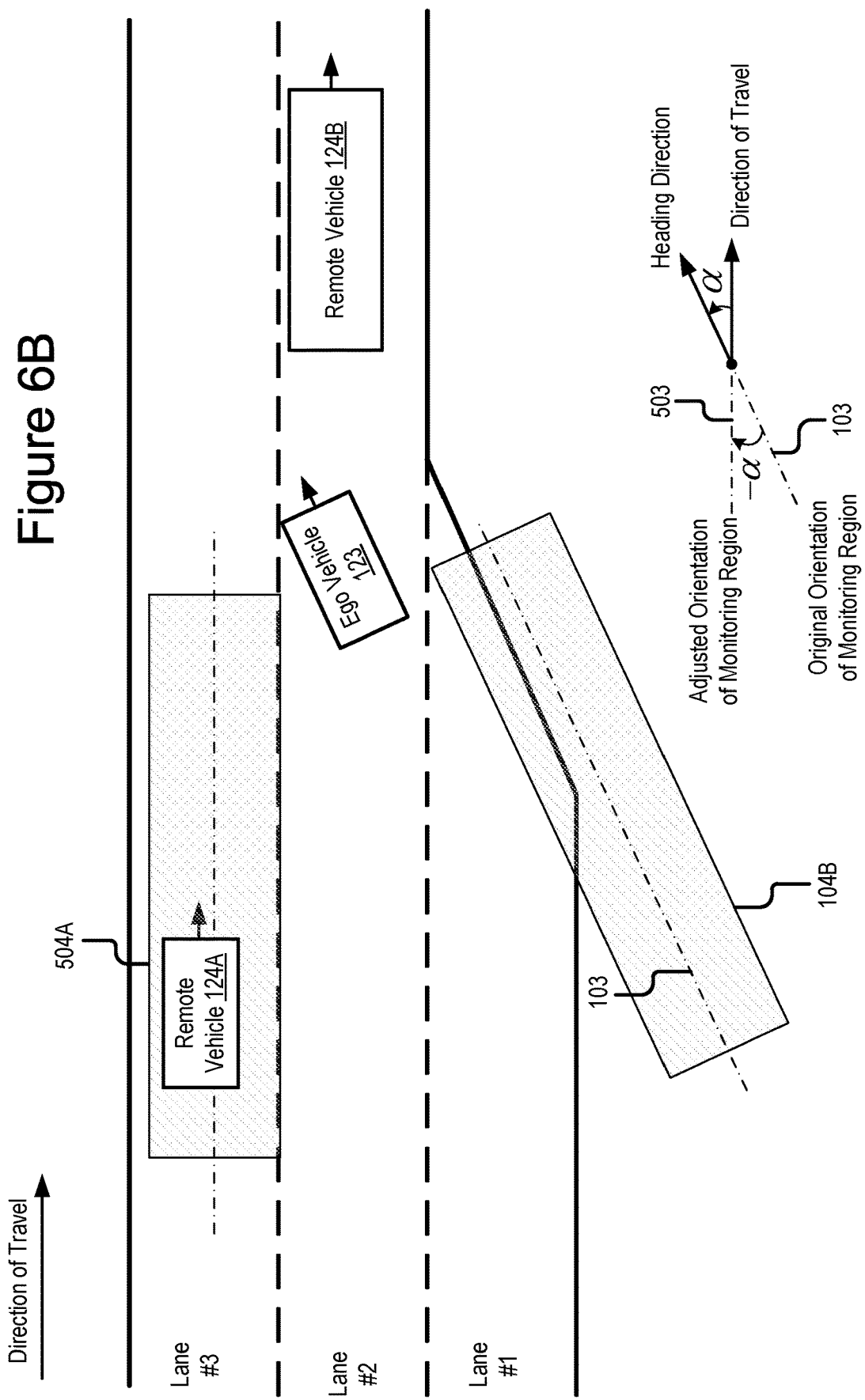

ADJUSTABLE BLIND SPOT MONITOR

BACKGROUND

The specification relates to adjusting a blind spot monitor on a vehicle to improve safety of the vehicle.

Blind spot monitors become increasingly popular in vehicles. However, existing blind spot monitors are primarily designed to identify potential collisions in use cases where the vehicles travel in a non-varying heading. This is problematic because vehicles need to sometimes execute maneuvers that require their heading to be quickly (and potentially temporarily) changed. For example, a vehicle that intends to execute a lane change maneuver needs to change its heading momentarily to travel from a current lane to a nearby lane. Existing solutions may fail to identify potential collisions in the vehicle's blind spot for the period of time when its heading is temporarily changed to move from its current lane to the nearby lane because the existing solutions are designed to operate best when the vehicle travels with a non-varying heading.

SUMMARY

Described are embodiments of a modification system installed in an electronic control unit (ECU) of a vehicle (e.g., an ego vehicle). The modification system is operable to modify an operation of a blind spot monitor on the vehicle based on a detected change in a heading of the vehicle so that the blind spot monitor continues to operate optimally even when the vehicle travels with a varying heading.

In some embodiments, the modification system described herein includes software installed in an electronic control unit of an ego vehicle. The modification system adaptively determines a heading of the ego vehicle. The modification system modifies a configuration of a blind spot monitor (e.g., one or more sensors of the blind spot monitor) based on a detected change in the heading of the ego vehicle. In this way, the modification system beneficially improves an operation of the ego vehicle so that collisions are avoided during lane change maneuvers and other driving maneuvers that include changes in the heading of the ego vehicle.

By comparison, existing solutions for blind spot monitors are not adequate because they are all designed to operate best when a vehicle is traveling with a non-varying heading. None of these existing solutions include any ability to (1) detect a change in a heading of a vehicle and to (2) modify an operation of the vehicle's blind spot monitor based on the change in the heading of the vehicle so that the blind spot monitor continues to operate optimally. No existing solution for blind spot monitors is concerned with modifying the operation of the vehicle's blind spot monitor based on a decreased performance that occurs due to a change in the heading of the vehicle. Thus, example advantages provided by the modification system described herein include, but are not limited to, the following functionality: (1) detecting a change in a heading of a vehicle; and (2) modifying an operation of the vehicle's blind spot monitor based on the change in the heading of the vehicle so that the blind spot monitor continues to operate optimally even when the vehicle travels with a varying heading.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a vehicle, including: detecting a change in a heading of the vehicle; and modifying an operation of a blind spot monitor on the vehicle based on the change in the heading of the vehicle so that performance of the blind spot monitor is enhanced to improve safety of the vehicle in a scenario when the vehicle changes the heading. Other embodiments of this aspect include corresponding computer systems, apparatus, and computer programs recorded on one or more computer storage devices, each configured to perform the actions of the methods.

Implementations may include one or more of the following features. The method where modifying the operation of the blind spot monitor on the vehicle based on the change in the heading of the vehicle includes: modifying a configuration of the blind spot monitor based on the change in the heading of the vehicle so that a monitoring region of the blind spot monitor is adjusted in accordance with the change in the heading of the vehicle. The method where modifying the configuration of the blind spot monitor based on the change in the heading of the vehicle includes: modifying one or more of an orientation and a location of the blind spot monitor based on the change in the heading of the vehicle. The method where modifying the one or more of the orientation and the location of the blind spot monitor based on the change in the heading of the vehicle includes: determining one or more of a change in the orientation and a change in the location of the blind spot monitor based on the change in the heading of the vehicle; and instructing an actuator of the blind spot monitor about the one or more of the change in the orientation and the change in the location of the blind spot monitor so that the actuator adjusts the one or more of the orientation and the location of the blind spot monitor based on the one or more of the change in the orientation and the change in the location of the blind spot monitor. The method further including: detecting that another vehicle is in the monitoring region of the blind spot monitor; modifying an operation of an Advanced Driver-Assistance System (ADAS system) of the vehicle to restrict a lane change of the vehicle; and providing a warning message to alert a driver of the vehicle that the other vehicle is in the monitoring region of the blind spot monitor. The method further including one or more of the following steps: detecting that no vehicle is in the monitoring region of the blind spot monitor; and modifying an operation of an ADAS system of the vehicle to complete a lane change for the vehicle. The method where detecting the change in the heading of the vehicle includes: receiving sensor data from one or more perception sensors; and analyzing the sensor data to determine the change in the heading of the vehicle. Implementations of the described techniques may include hardware, a method or process, or computer software on a computer-accessible medium.

One general aspect includes a system including an onboard vehicle computer system of a vehicle including a non-transitory memory storing computer code which, when executed by the onboard vehicle computer system, causes the onboard vehicle computer system to: detect a change in a heading of the vehicle; and modify an operation of a blind spot monitor on the vehicle based on the change in the heading of the vehicle so that performance of the blind spot monitor is enhanced to improve safety of the vehicle in a scenario when the vehicle changes the heading. Other embodiments of this aspect include corresponding computer systems, apparatus, and computer programs recorded on one or more computer storage devices, each configured to perform the actions of the methods.

Implementations may include one or more of the following features. The system where the computer code, when executed by the onboard vehicle computer system, causes the onboard vehicle computer system to modify the operation of the blind spot monitor on the vehicle based on the change in the heading of the vehicle at least by: modifying a configuration of the blind spot monitor based on the change in the heading of the vehicle so that a monitoring region of the blind spot monitor is adjusted in accordance with the change in the heading of the vehicle. The system where the computer code, when executed by the onboard vehicle computer system, causes the onboard vehicle computer system to modify the configuration of the blind spot monitor based on the change in the heading of the vehicle at least by: modifying one or more of an orientation and a location of the blind spot monitor based on the change in the heading of the vehicle. The system where the computer code, when executed by the onboard vehicle computer system, causes the onboard vehicle computer system to modify the one or more of the orientation and the location of the blind spot monitor based on the change in the heading of the vehicle at least by: determining one or more of a change in the orientation and a change in the location of the blind spot monitor based on the change in the heading of the vehicle; and instructing an actuator of the blind spot monitor about the one or more of the change in the orientation and the change in the location of the blind spot monitor so that the actuator adjusts the one or more of the orientation and the location of the blind spot monitor based on the one or more of the change in the orientation and the change in the location of the blind spot monitor. The system where the computer code, when executed by the onboard vehicle computer system, causes the onboard vehicle computer system further to: detect that another vehicle is in the monitoring region of the blind spot monitor; modify an operation of an ADAS system of the vehicle to restrict a lane change of the vehicle; and provide a warning message to alert a driver of the vehicle that the other vehicle is in the monitoring region of the blind spot monitor. The system where the computer code, when executed by the onboard vehicle computer system, causes the onboard vehicle computer system to execute one or more of the following operations: detect that no vehicle is in the monitoring region of the blind spot monitor; and modify an operation of an ADAS system of the vehicle to complete a lane change for the vehicle. The system where the computer code, when executed by the onboard vehicle computer system, causes the onboard vehicle computer system to detect the change in the heading of the vehicle at least by executing one or more of the following operations: receiving sensor data from one or more perception sensors; and analyzing the sensor data to determine the change in the heading of the vehicle. Implementations of the described techniques may include hardware, a method or process, or computer software on a computer-accessible medium.

One general aspect includes a computer program product including a non-transitory memory of an onboard vehicle computer system of a vehicle storing computer-executable code that, when executed by a processor, causes the processor to: detect a change in a heading of the vehicle; and modify an operation of a blind spot monitor on the vehicle based on the change in the heading of the vehicle so that performance of the blind spot monitor is enhanced to improve safety of the vehicle in a scenario when the vehicle changes the heading. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor to modify the operation of the blind spot monitor on the vehicle based on the change in the heading of the vehicle at least by: modifying a configuration of the blind spot monitor based on the change in the heading of the vehicle so that a monitoring region of the blind spot monitor is adjusted in accordance with the change in the heading of the vehicle. The computer program product where the computer-executable code, when executed by the processor, causes the processor to modify the configuration of the blind spot monitor based on the change in the heading of the vehicle at least by: modifying one or more of an orientation and a location of the blind spot monitor based on the change in the heading of the vehicle. The computer program product where the computer-executable code, when executed by the processor, causes the processor to modify the one or more of the orientation and the location of the blind spot monitor based on the change in the heading of the vehicle at least by: determining one or more of a change in the orientation and a change in the location of the blind spot monitor based on the change in the heading of the vehicle; and instructing an actuator of the blind spot monitor about the one or more of the change in the orientation and the change in the location of the blind spot monitor so that the actuator adjusts the one or more of the orientation and the location of the blind spot monitor based on the one or more of the change in the orientation and the change in the location of the blind spot monitor. The computer program product where the computer-executable code, when executed by the processor, causes the processor further to: detect that another vehicle is in the monitoring region of the blind spot monitor; modify an operation of an ADAS system of the vehicle to restrict a lane change of the vehicle; and provide a warning message to alert a driver of the vehicle that the other vehicle is in the monitoring region of the blind spot monitor. The computer program product where the computer-executable code, when executed by the processor, causes the processor further to execute one or more of the following operations: detect that no vehicle is in the monitoring region of the blind spot monitor; and modify an operation of an ADAS system of the vehicle to complete a lane change for the vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6A-6B are graphic representations illustrating another example use case where a blind spot monitor on a vehicle is modified to have an adjusted monitoring region according to some embodiments.

DETAILED DESCRIPTION

Figure 1A:
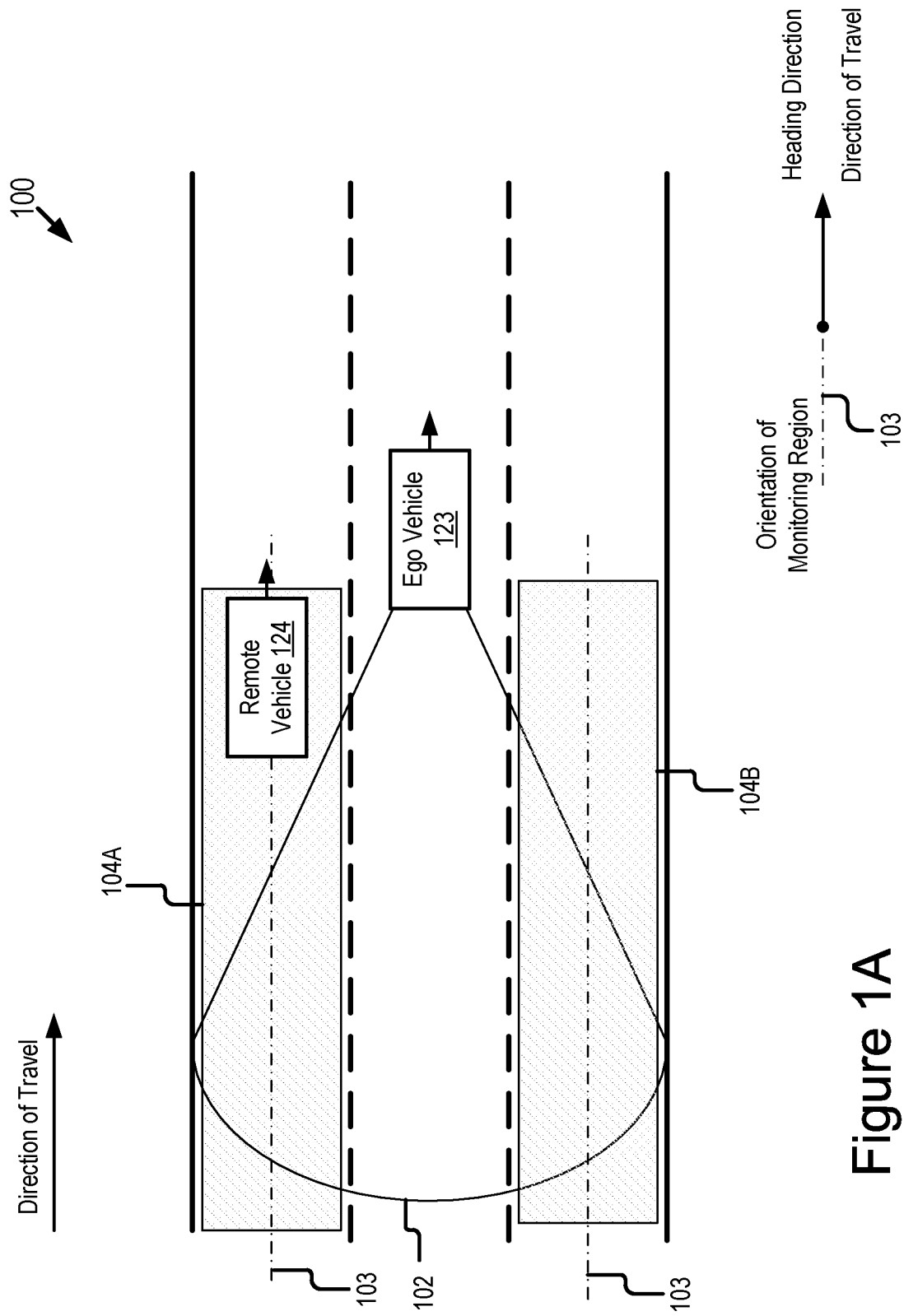
FIG. 1A is a graphic representation depicting an example use case that illustrates an operation of an example blind spot monitor onboard on a vehicle.

Existing blind spot monitors are primarily designed for a use case where a vehicle travels straight ahead. For example, referring to an example use case 100 shown in FIG. 1A, a blind spot monitor is installed on an ego vehicle 123 with a direction of travel to the right. A region on the road that can be viewed through side-view mirrors and an interior rear-view mirror of the ego vehicle 123 is shown as a sector 102. The blind spot monitor of the ego vehicle 123 is configured to monitor other vehicles on adjacent lanes of the ego vehicle 123. For example, the ego vehicle 123 is traveling straight ahead (in this case, a heading direction of the ego vehicle 123 is the same as the direction of travel), and two monitoring regions 104A and 104B of the blind spot monitor (depicted with shaded areas) are shown in FIG. 1A, with a first monitoring region 104A on a left adjacent lane of the ego vehicle 123 and a second monitoring region 104B on a right adjacent lane of the ego vehicle 123.

Here, a monitoring region is a region of a roadway environment that is monitored by the blind spot monitor. Generally, the blind spot monitor has two monitoring regions, with a first monitoring region on a left side of the ego vehicle 123 and a second monitoring region on a right side of the ego vehicle 123. The monitoring regions not only include blind spots of the ego vehicle 123 but also include other regions on the road. However, only adjacent lanes are considered in the monitoring regions.

Here, for convenience of description below, each monitoring region 104A or 104B is shown with a center line 103 that is in parallel with the monitoring region 104A or 104B. The center line 103 can be used to indicate an orientation of the monitoring region 104A or 104B. For example, as the ego vehicle 123 travels straight ahead, the orientation of the monitoring region 104A or 104B (e.g., the center line 103 of the monitoring region 104A or 104B) is in parallel with the direction of travel as well as a heading direction of the ego vehicle 123.

In some scenarios, a driver of the ego vehicle 123 may not be able to see a remote vehicle 124 traveling in an adjacent lane. Since a heading of the ego vehicle 123 is constant, the ego vehicle's blind spot monitor is able to detect the remote vehicle 124 traveling in the adjacent lane (e.g., the blind spot monitor is able to detect the remote vehicle 124 traveling in the left adjacent lane once the remote vehicle 124 enters the first monitoring region 104A). However, this may not be true if the heading of the ego vehicle 123 is variable, i.e., non-constant, as described below with reference to FIGS. 1B-1C.

Various limitations exist for existing blind spot monitors. For example, the existing blind spot monitors provide their functionality under an assumption that a vehicle's heading with respect to a road direction is 0 degree. In another example, the existing blind spot monitors only consider monitoring vehicles with a short lateral distance with respect to the ego vehicle (e.g., vehicles to be monitored are on the adjacent lanes of the ego vehicle). The existing blind spot monitors filter out vehicles with a larger lateral distance with respect to the ego vehicle (e.g., vehicles that are not on the adjacent lanes are not monitored). In yet another example, when the ego vehicle's heading is relatively large (e.g., 30 degrees relative to the direction of travel), vehicles on an adjacent lane can also be filtered out from being monitored (see, e.g., FIG. 1C).

Figure 1B:
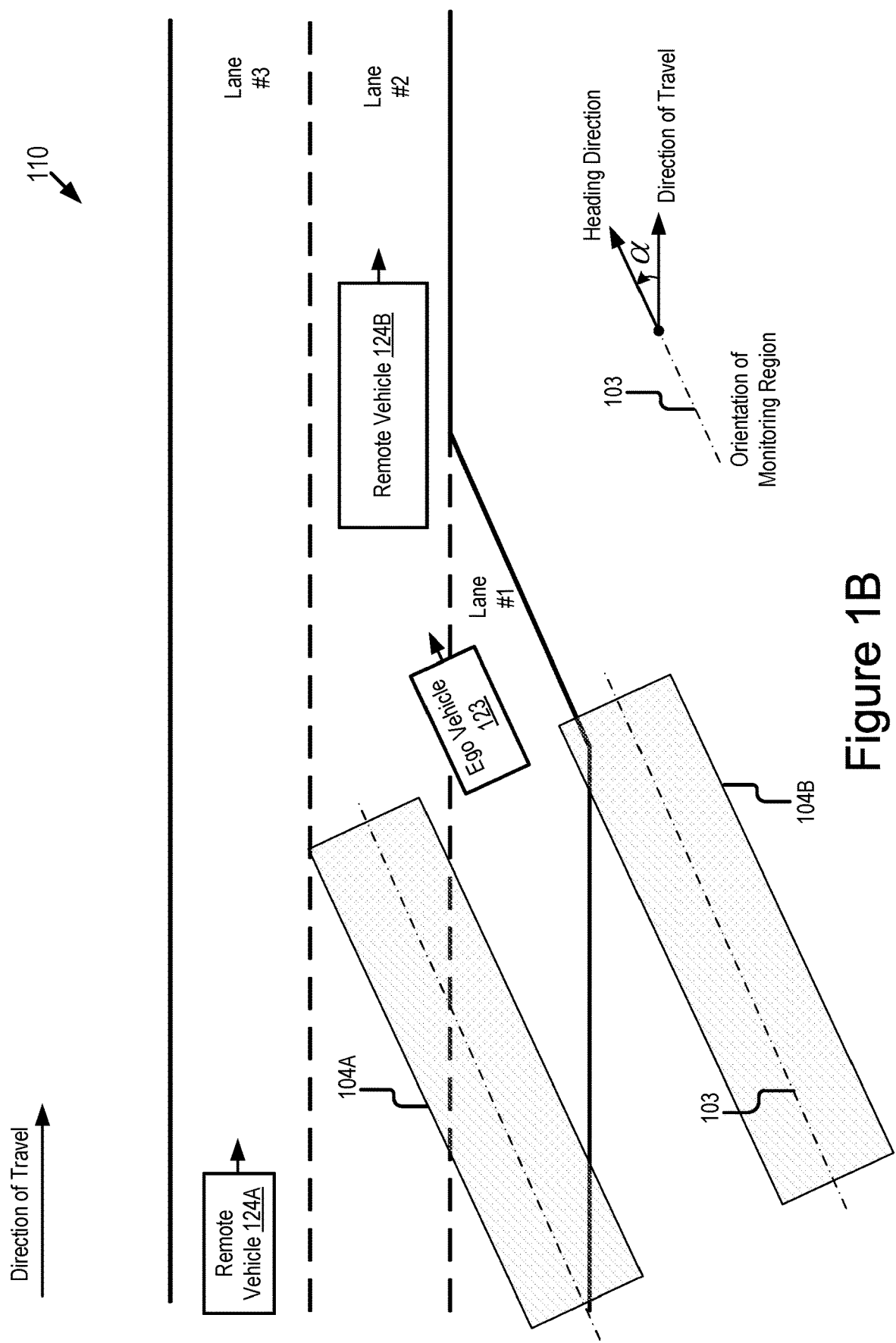
FIGS. 1B-1C are graphic representations illustrating an example use case where the blind spot monitor of FIG. 1A fails to detect another vehicle in a blind spot of the vehicle.
Figure 1C:
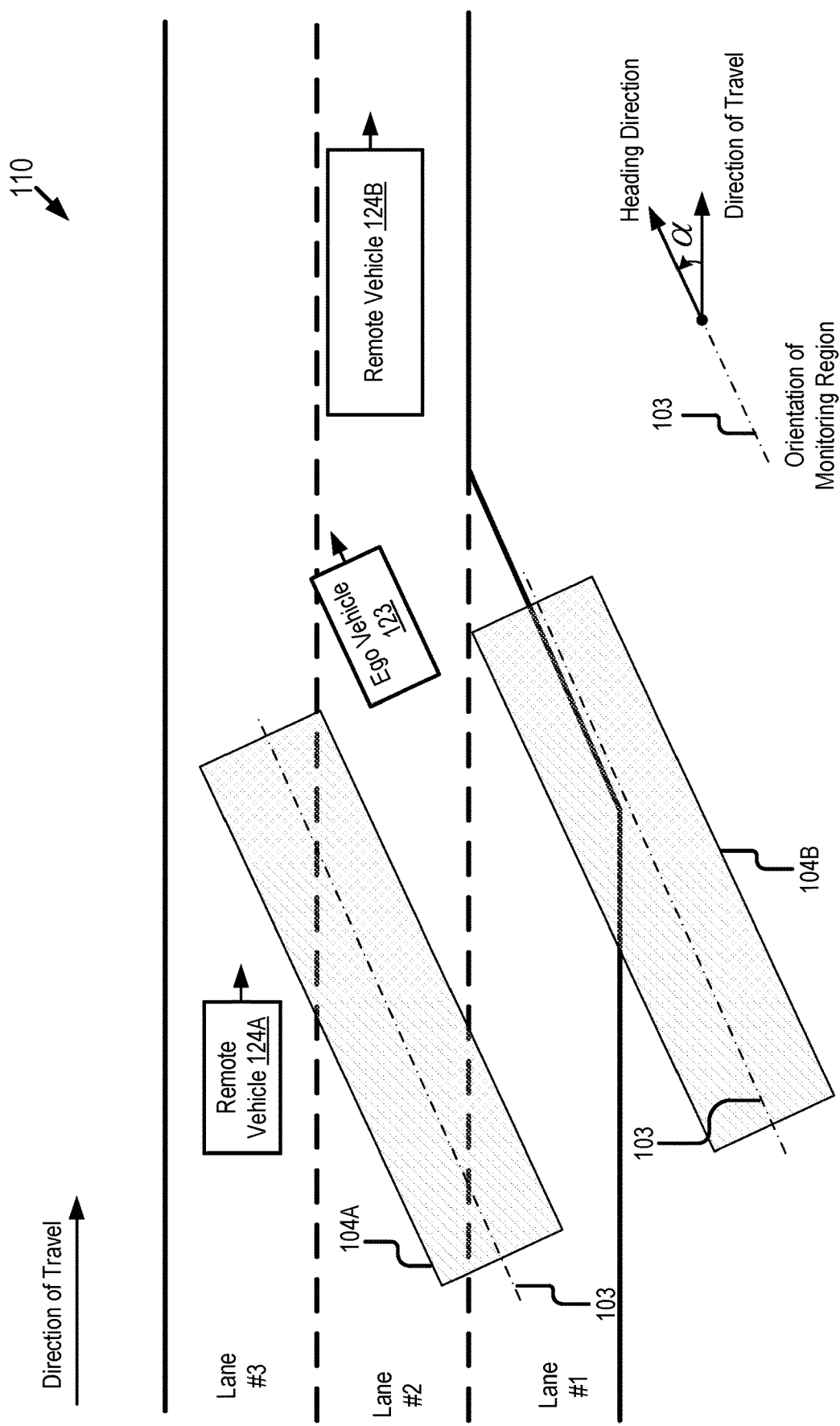

FIGS. 1B-1C are graphic representations collectively illustrating an example use case 110 where the existing blind spot monitor of FIG. 1A fails to detect a remote vehicle 124A in a blind spot when the ego vehicle 123 makes consecutive lane changes. A roadway environment in FIGS. 1B-1C includes two remote vehicles 124A and 124B and the ego vehicle 123. As depicted in FIGS. 1B-1C, the ego vehicle 123 varies its heading multiple times in order to achieve a lane change maneuver.

Referring to FIG. 1B, the ego vehicle 123 changes its heading by α degrees from the direction of travel in order to achieve a lane change from Lane #1 to Lane #2. When the ego vehicle 123 changes its heading by α degrees from the direction of travel, the orientation of the monitoring regions 104A and 104B of the existing blind spot monitor also change α degrees from the direction of travel (because the orientation of the monitoring regions 104A and 104B of the existing blind spot monitor is configured to be in parallel with the heading of the ego vehicle 123). As shown in FIG. 1B, the monitoring regions 104A and 104B of the existing blind spot monitor are no longer in parallel with the direction of travel when compared to FIG. 1A.

Next, referring to FIG. 1C, the ego vehicle 123 continues to keep the change in its heading by α degrees from the direction of travel in order to achieve another lane change from Lane #2 to Lane #3. Similarly, the orientation of the monitoring regions 104A and 104B of the existing blind spot monitor also change α degrees from the direction of travel. Of course, the ego vehicle 123 can change its heading by another angle (rather than by α degrees) from the direction of travel in order to achieve a lane change from Lane #2 to Lane #3, which is not limited thereto.

As depicted in FIG. 1C, the existing blind spot monitor fails to detect the remote vehicle 124A in the adjacent lane "Lane #3" because the heading of the ego vehicle 123 varies, and the existing blind spot monitor is not configured to operate optimally during times when the ego vehicle 123 is traveling with a varying heading. For example, the monitoring region 104A of the existing blind spot monitor does not cover the remote vehicle 124A in the adjacent lane "Lane #3," and so, the existing blind spot monitor fails to detect the remote vehicle 124A in the blind spot when the ego vehicle 123 performs the lane change from Lane #2 to Lane #3.

With combined reference to FIGS. 1B-1C, the existing blind spot monitor fails to monitor the remote vehicle 124A, which may potentially cause a collision between the ego vehicle 123 and the remote vehicle 124A if the ego vehicle 123 makes consecutive lane changes to Lane #3 in which the remote vehicle 124A travels.

Embodiments described herein provide a modification system that modifies an operation of a blind spot monitor based on detected changes in a heading of a vehicle so that the blind spot monitor continues to operate optimally during times when the vehicle is traveling with a varying heading. Therefore, limitations of the existing blind spot monitor described above can be removed by implementing the modification system in the ego vehicle. The modification system is described below in more detail.

Example Overview

Figure 1D:
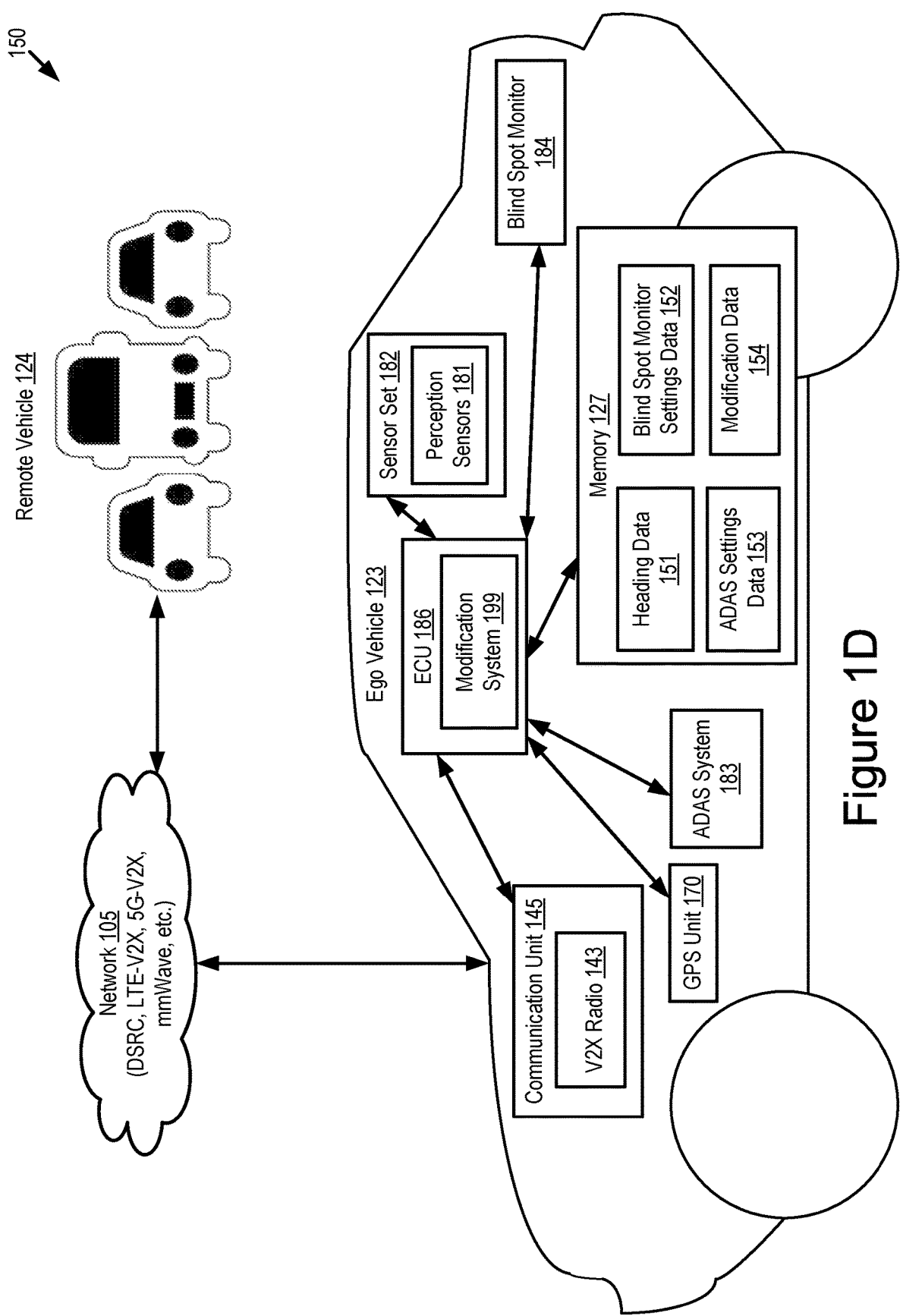
FIG. 1D is a block diagram illustrating an operating environment for a modification system according to some embodiments.

Referring to FIG. 1D, depicted is an operating environment 150 for a modification system 199 according to some embodiments. The operating environment 150 may include one or more of the following elements: the ego vehicle 123; and one or more remote vehicles 124. These elements of the operating environment 150 may be communicatively coupled to a network 105.

Although one ego vehicle 123, three remote vehicles 124 and one network 105 are depicted in FIG. 1D, in practice the operating environment 150 may include any number of ego vehicles 123, any number of remote vehicles 124 and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving vehicle-to-everything (V2X) wireless messages among various endpoints (e.g., vehicles, roadside equipment, etc.) that each include a V2X radio. Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

In some embodiments, the ego vehicle 123 and the remote vehicle 124 may have a similar structure, and the description provided below for the ego vehicle 123 may also be applicable to the remote vehicle 124.

In some embodiments, at least one remote vehicle 124 is a connected vehicle like the ego vehicle 123. In some embodiments, at least one remote vehicle 124 is an unconnected vehicle. The remote vehicle 124 includes elements that are similar to those of the ego vehicle 123 including, for example, the sensors and the V2X radio. In some embodiments, the remote vehicle 124 includes its own instance of the modification system 199.

In some embodiments, one or more of the ego vehicle 123 and the remote vehicle 124 may be DSRC-equipped vehicles. The network 105 may include one or more communication channels shared among the ego vehicle 123, the remote vehicle 124 and one or more RSUs. The one or more communication channels may include DSRC, LTE-V2X, full-duplex wireless communication or any other wireless communication protocol. For example, the network 105 may be used to transmit a DSRC message, DSRC probe or BSM including any of the data described herein.

In some embodiments, a DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

The ego vehicle 123 may be any type of vehicle. For example, the ego vehicle 123 may include one of the following types of vehicles: a car; a truck; a sports utility vehicle; a bus; a semi-truck; a drone or any other roadway-based conveyance.

In some embodiments, the ego vehicle 123 may include an autonomous vehicle or a semi-autonomous vehicle. For example, the ego vehicle 123 may include an Advanced Driver-Assistance System (e.g., an ADAS system 183). The ADAS system 183 may provide some or all of the functionality that provides autonomous functionality.

The ego vehicle 123 may include one or more of the following elements: a processor 125; a memory 127; a communication unit 145; a GPS unit 170; a sensor set 182; the ADAS system 183; a blind spot monitor 184; an ECU 186; and the modification system 199. These elements of the ego vehicle 123 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the modification system 199. The onboard vehicle computer system may be operable to access and execute the data stored on the memory 127 to provide the functionality described herein for the modification system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 may include one or more memories 127.

The memory 127 of the ego vehicle 123 may store one or more of the following elements: heading data 151; blind spot monitor settings data 152; ADAS settings data 153; and modification data 154.

The heading data 151 includes digital data that describes a change in the heading of the ego vehicle 123 as determined based on one or more sensor measurements recorded by one or more perception sensors 181 of the sensor set 182. For example, the heading data 151 includes digital data describing a current heading of the ego vehicle 123 relative to a direction of travel. In a further example, the heading data 151 describes that the current heading of the ego vehicle 123 is 40 degrees to the left of the direction of travel.

The blind spot monitor settings data 152 includes digital data that describes one or more settings for controlling an operation of the blind spot monitor 184, including controlling which portions of a roadway environment are monitored by the blind spot monitor 184.

The ADAS settings data 153 includes digital data that describes one or more settings for the ADAS system 183 of the ego vehicle 123. For example, assume that the ego vehicle 123 changes its heading to the right in order to make a right lane change. If there is another vehicle in a monitoring region (e.g., a right monitoring region) of the blind spot monitor 184 of the ego vehicle 123, then the modification system 199 can generate the ADAS settings data 153 that includes a cancellation of the right lane change, where the ADAS settings data 153 causes the ADAS system 183 to cancel the right lane change for the ego vehicle 123. On the other hand, if there is no vehicle in the right monitoring region of the blind spot monitor 184, then the modification system 199 can generate the ADAS settings data 153 that includes an execution of the right lane change, where the ADAS settings data 153 causes the ADAS system 183 to execute the right lane change for the ego vehicle 123.

The modification data 154 includes digital data calculated by the modification system 199 based on the heading data 151. The modification data 154 describes one or more modifications for the blind spot monitor settings data 152, one or more modifications for the ADAS settings data 153 or a combination thereof.

In some embodiments, the modification data 154 describes a change in an orientation of the blind spot monitor 184 to adjust a monitoring region of the blind spot monitor 184 (e.g., the modification system 199 may instruct an actuator of the blind spot monitor 184 about a change in a physical orientation of the blind spot monitor 184 based on the modification data 154 so that the actuator modifies the physical orientation of the blind spot monitor 184). The change in the orientation of the blind spot monitor 184 may lead to an adjustment of the monitoring region of the blind spot monitor 184. In some embodiments, an actuator is not needed and adjustments of the monitoring regions of the blind spot monitor 184 are achieved using only software changes to the blind spot monitor 184 and no hardware changes.

The communication unit 145 transmits and receives data to and from the network 105 or to another communication channel. In some embodiments, the communication unit 145 may include a DSRC transceiver, a DSRC receiver and other hardware or software necessary to make the ego vehicle 123 a DSRC-enabled device. For example, the communication unit 145 includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002

Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 143. The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

In some embodiments, the GPS unit 170 is a conventional GPS unit of the ego vehicle 123. For example, the GPS unit 170 may include hardware that wirelessly communicates with a GPS satellite to retrieve data that describes a geographic location of the ego vehicle 123. For example, the GPS unit 170 retrieves GPS data describing the geographic location of the ego vehicle 123 from one or more GPS satellites. In some embodiments, the GPS unit 170 is a DSRC-compliant GPS unit of the ego vehicle 123 that is operable to provide GPS data describing the geographic location of the ego vehicle 123 with lane-level accuracy.

The sensor set 182 includes one or more sensors that are operable to measure a roadway environment outside of the ego vehicle 123. For example, the sensor set 182 may include one or more sensors that record one or more physical characteristics of the roadway environment that is proximate to the ego vehicle 123. The memory 127 may store sensor data that describes the one or more physical characteristics recorded by the sensor set 182. The roadway environment outside of the ego vehicle 123 may include the remote vehicle 124, and so, one or more of the sensors of the sensor set 182 may record sensor data that describes information about the remote vehicle 124.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 182 includes one or more perception sensors 181. The perception sensors 181 are onboard sensors whose sensor measurements are usable to determine changes in the heading of the ego vehicle 123 and changes in the settings of the blind spot monitor 184 that correspond to the changes in the heading of the ego vehicle 123. The perception sensors 181 include, for example, range finding and position locating sensors such as a camera, a LIDAR, radar and GPS, as well as any other sensors that may be used to determine changes in the heading of the ego vehicle 123 and changes in the settings of the blind spot monitor 184 that correspond to the changes in the heading of the ego vehicle 123. Other types of the perception sensors 181 are possible.

For example, a camera sensor can be used to capture images of the roadway environment, and the modification system 199 may perform one or more image processing techniques on the images received from the camera sensor to determine a likelihood that a particular pixel that belongs to a portion of an image depicts a lane marker. In this way, the modification system 199 can determine lane markers in the roadway environment.

In another example, a LIDAR sensor can be used to identify the lane markers with the aid of a global positioning system/inertial navigation system (GPS/INS). The GPS/INS includes the use of GPS satellite signals to correct or calibrate a solution from an inertial navigation system (INS). Specifically, painted lane markers are detected from an intensity of the LIDAR sensor. In contrast to images from cameras, the laser reflectivity and range data is insensitive to background light and shadows while producing only sparse images. In order to increase the density of the lane marker information, subsequent scans are registered and accumulated employing GPS/INS information.

The ECU 186 includes an embedded system in automotive electronics that controls one or more of electrical systems or subsystems in the ego vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ego vehicle 123 may include multiple ECUs 186. In some embodiments, the modification system 199 may be an element of the ECU 186.

In some embodiments, the ADAS system 183 is a conventional ADAS system that controls operation of the ego vehicle 123. In some embodiments, the ADAS system 183 may also include any software or hardware included in the ego vehicle 123 that makes the ego vehicle 123 an autonomous vehicle or a semi-autonomous vehicle.

Examples of the ADAS system 183 may include one or more of the following elements of the ego vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the blind spot monitor 184 can be a convention blind spot monitor. In some embodiments, the blind spot monitor 184 may be movable by an actuator that is installed on the blind spot monitor 184. For example, the actuator may modify an orientation of the blind spot monitor 184, a location of the blind spot monitor 184 or both the orientation and location of the blind spot monitor 184 based on the modification data 154 received from the modification system 199 so that a monitoring region of the blind spot monitor 184 can be adjusted.

In some other embodiments, the blind spot monitor 184 is not movable (e.g., the blind spot monitor 184 does not have an actuator). A monitoring region of the blind spot monitor 184 can be adjusted through software changes to the blind spot monitor 184. For example, the blind spot monitor 184 can receive the modification data 154 from the modification system 199, where the reception of the modification data 154 causes the software installed in the blind spot monitor 184 to be updated to adjust the monitoring region of the blind spot monitor 184.

In some embodiments, the modification system 199 includes software that is operable, when executed by the processor 125, to cause the processor 125 to execute one or more steps of methods 300, 400 and 450 described below with reference to FIGS. 3-4B and one or more operations described below with reference to FIGS. 5A-5B and 6A-6B.

In some embodiments, the modification system 199 may be implemented using hardware including a field-programmable gate array ("FPGA") or an application-specific integrated circuit ("ASIC"). In some other embodiments, the modification system 199 may be implemented using a combination of hardware and software. The modification system 199 may be stored in a combination of the devices (e.g., servers or other devices), or in one of the devices.

In some embodiments, the modification system 199 adaptively determines a heading of the ego vehicle 123. The modification system 199 modifies a configuration of the blind spot monitor 184 based on detected changes in the heading of the ego vehicle 123. In this way, the modification system 199 beneficially improves the operation of the ego vehicle 123 so that collisions are avoided during lane change maneuvers and other driving maneuvers that include changes in the heading of the ego vehicle 123. The modification system 199 is described in more detail below with reference to FIGS. 2-6B.

Example Computer System

Figure 2:
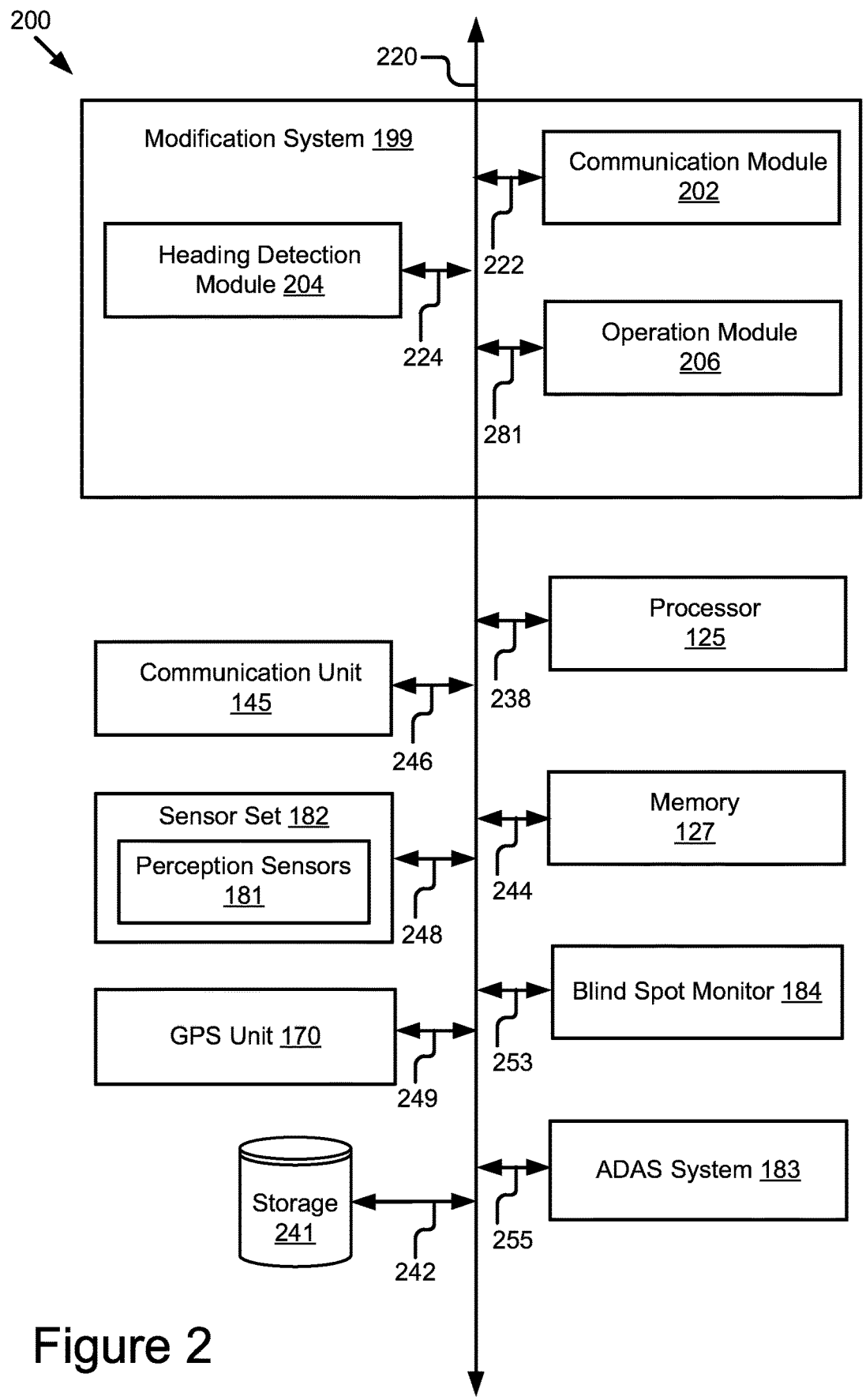
FIG. 2 is a block diagram illustrating an example computer system including a modification system according to some embodiments.

Referring now to FIG. 2, depicted is a block diagram illustrating an example computer system 200 including the modification system 199 according to some embodiments. In some embodiments, the computer system 200 may include a special-purpose computer system that is programmed to perform one or more steps of methods 300, 400 and 450 described below with reference to FIGS. 3-4B and one or more operations described below with reference to FIGS. 5A-5B and 6A-6B.

In some embodiments, the computer system 200 may be an element of the ego vehicle 123. In some embodiments, the computer system 200 may be an onboard vehicle computer of the ego vehicle 123. In some embodiments, the computer system 200 may include an engine control unit, head unit or some other processor-based computing device of the ego vehicle 123.

The computer system 200 may include one or more of the following elements according to some examples: the modification system 199; the processor 125; the communication unit 145; the sensor set 182; the GPS unit 170; the memory 127; the blind spot monitor 184; the ADAS system 183; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244. The blind spot monitor 184 is communicatively coupled to the bus 220 via a signal line 253. The ADAS system 183 is communicatively coupled to the bus 220 via a signal line 255.

The following elements of the computer system 200 are described above with reference to FIG. 1D, and so, those descriptions will not be repeated here: the processor 125; the communication unit 145; the sensor set 182; the GPS unit 170; the blind spot monitor 184; the ADAS system 183; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the modification system 199 includes: a communication module 202; a heading detection module 204; and an operation module 206. These components of the modification system 199 are communicatively coupled to each other via the bus 220. In some embodiments, components of the modification system 199 can be stored in a single server or device. In some other embodiments, components of the modification system 199 can be distributed and stored across multiple servers or devices. For example, some of the components of the modification system 199 may be distributed across the remote vehicle 124 and the ego vehicle 123.

The communication module 202 can be software including routines for handling communications between the modification system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 150. For example, the communication module 202 receives or transmits, via the communication unit 145, a V2X wireless message. The communication module 202 may send or receive any of the data or messages described above with reference to FIG. 1D via the communication unit 145.

In some embodiments, the communication module 202 receives data from components of the modification system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the modification system 199. For example, the communication module 202 may handle communications among the heading detection module 204 and the operation module 206. Any of these modules may cause the communication module 202 to communicate with the other elements of the computer system 200 or the operating environment 150 (via the communication unit 145). For example, the heading detection module 204 may use the communication module 202 to communicate with the sensor set 182 and cause the sensor set 182 to record sensor data.

The heading detection module 204 can be software including routines for detecting a current heading or a change in a heading of the ego vehicle 123. In some embodiments, the heading detection module 204 can be stored in the memory 127 of the computer system 200 and can be accessible and executable by the processor 125. The heading detection module 204 may be adapted for cooperation and communication with the processor 125 and other components of the computer system 200 via a signal line 224.

In some embodiments, the heading detection module 204 may operate one or more sensors of the sensor set 182 to generate sensor data describing the measurements of the sensor set 182. The heading detection module 204 may cause the sensor data to be stored in the memory 127. Specifically, the heading detection module 204 may operate one or more sensors included in the sensor set 182 to record sensor data describing measurements of a physical environment proximate to the computer system 200. The remote vehicle 124 may be located in the physical environment proximate to the ego vehicle 123 that includes the computer system 200.

In some embodiments, the heading detection module 204 is operable to detect a change in the heading of the ego vehicle 123. For example, the heading detection module 204 receives sensor data from one or more perception sensors 181 and analyzes the sensor data to determine the change in the heading of the ego vehicle 123. In a further example, the heading detection module 204 determines that the heading of the ego vehicle 123 has changed to 30 degrees on the right relative to a road direction based on an analysis of the sensor data.

The operation module 206 can be software including routines that, when executed by the processor 125, cause the processor 125 to modify an operation of the blind spot monitor 184 based on a detected change in the heading of the ego vehicle 123. In some embodiments, the operation module 206 can be a set of instructions stored in the memory 127 of the computer system 200 and can be accessible and executable by the processor 125. The operation module 206 may be adapted for cooperation and communication with the processor 125 and other components of the computer system 200 via a signal line 281.

In some embodiments, the operation module 206 is operable to modify an operation of the blind spot monitor 184 onboard on the ego vehicle 123 based on the change in the heading of the ego vehicle 123 so that performance of the blind spot monitor 184 is enhanced to improve safety of the ego vehicle 123 in a scenario when the ego vehicle 123 changes its heading. For example, the operation module 206 modifies a configuration of the blind spot monitor 184 based on the change in the heading of the ego vehicle 123 so that a monitoring region of the blind spot monitor 184 is adjusted in accordance with the change in the heading of the ego vehicle 123.

In some embodiments, the configuration of the blind spot monitor 184 includes an orientation of the blind spot monitor 184, a location of the blind spot monitor 184 or a combination thereof. The operation module 206 modifies the configuration of the blind spot monitor 184 at least by: modifying the orientation of the blind spot monitor 184 based on the change in the heading of the ego vehicle 123; modifying the location of the blind spot monitor 184 based on the change in the heading of the ego vehicle 123; or modifying both the orientation and the location of the blind spot monitor 184 based on the change in the heading of the ego vehicle 123.

In some embodiments, the blind spot monitor 184 includes an actuator. The operation module 206 determines one or more of a change in the orientation and a change in the location of the blind spot monitor 184 based on the change in the heading of the ego vehicle 123. The operation module 206 instructs the actuator of the blind spot monitor 184 about the one or more of the change in the orientation and the change in the location of the blind spot monitor 184. Then, the actuator adjusts the one or more of the orientation and the location of the blind spot monitor 184 based on the one or more of the change in the orientation and the change in the location of the blind spot monitor 184.

For example, based on the change in the heading of the ego vehicle 123, the operation module 206 generates modification data describing one or more modifications for the blind spot monitor settings (e.g., a change in the orientation of the blind spot monitor 184, a change in the location of the blind spot monitor 184 or a combination thereof). The operation module 206 sends the modification data to the blind spot monitor 184, where reception of the modification data in the blind spot monitor 184 results in an adjustment of a monitoring region of the blind spot monitor 184 based on the change in the heading of the ego vehicle 123. In this case, if the blind spot monitor 184 includes an actuator, the actuator may modify the orientation of the blind spot monitor 184, the location of the blind spot monitor 184 or both the orientation and the location of the blind spot monitor 184 based on the modification data so that the monitoring region of the blind spot monitor 184 is adjusted in accordance with the change in the heading of the ego vehicle 123. On the other hand, if the blind spot monitor 184 is not movable (e.g., the blind spot monitor 184 does not include an actuator), the reception of the modification data in the blind spot monitor 184 may cause software installed in the blind spot monitor 184 to be updated to adjust the monitoring region of the blind spot monitor 184.

Examples of an adjustment of the monitoring region of the blind spot monitor 184 are illustrated below in more detail with reference to FIGS. 5A-5B and 6A-6B.

In some embodiments, after adjusting the monitoring region of the blind spot monitor 184 based on the change in the heading of the ego vehicle 123, the operation module 206 determines whether there is any other vehicle in the adjusted monitoring region of the blind spot monitor 184. If the operation module 206 detects that another vehicle (e.g., a remote vehicle 124) is in the adjusted monitoring region of the blind spot monitor 184, the operation module 206 may modify an operation of the ADAS system 183 of the ego vehicle 123 to restrict a lane change of the ego vehicle 123. Furthermore, the operation module 206 may provide a warning message to alert a driver of the ego vehicle 123 that another vehicle is in the adjusted monitoring region of the blind spot monitor 184.

For example, assume that the ego vehicle 123 changes its heading and intends to make a right lane change. Responsive to detecting that the remote vehicle 124 being in the adjusted right monitoring region, the operation module 206 may generate modification data that includes one or more modifications to the settings of the ADAS system 183, which may cause the ADAS system 183 to cancel the right lane change for the ego vehicle 123.

On the other hand, if the operation module 206 detects that no vehicle is in the adjusted monitoring region of the blind spot monitor 184, the operation module 206 may modify an operation of the ADAS system 183 of the ego vehicle 123 to complete a lane change for the ego vehicle 123.

An example application of the modification system 199 including the heading detection module 204 and the operation module 206 is provided here. For example, assume that the ego vehicle 123 changes its heading from the direction of travel and intends to make a lane change. The heading detection module 204 detects a change in the heading of the ego vehicle 123 based on sensor data received from the perception sensors 181. The heading detection module 204 also determines a first side of the ego vehicle 123 on which the ego vehicle 123 intends to make the lane change based on the change in the heading of the ego vehicle 123 (e.g., since the ego vehicle 123 may make the lane change on the left side or on the right side of the vehicle, the heading detection module 204 determines whether the ego vehicle 123 intends to make a left lane change or a right lane change based on the change in the heading of the ego vehicle 123).

Then, the operation module 206 modifies an operation of the blind spot monitor 184 based on (1) the change in the heading of the ego vehicle 123 and (2) an identification of the first side on which the ego vehicle 123 makes the lane change, so that a first monitoring region of the blind spot monitor 184 on the first side of the ego vehicle 123 is adjusted in accordance with the change in the heading of the ego vehicle 123. For example, based on the change in the heading of the ego vehicle 123 and the identification of the first side on which the ego vehicle 123 makes the lane change, the operation module 206 generates modification data describing one or more modifications for the blind spot monitor settings, where reception of the modification data in the blind spot monitor 184 results in an adjustment of the first monitoring region on the first side of the blind spot monitor 184 based on the change in the heading of the ego vehicle 123. A second monitoring region on a second side of the blind spot monitor 184 may or may not be adjusted based on the modification data.

Next, after adjusting the first monitoring region of the blind spot monitor 184, the operation module 206 determines whether there is any other vehicle in the first monitoring region of the blind spot monitor 184. If the operation module 206 detects that a remote vehicle 124 is in the first monitoring region of the blind spot monitor 184, the operation module 206 may modify an operation of the ADAS system 183 of the ego vehicle 123 to cancel the lane change of the ego vehicle 123 on the first side. On the other hand, if the operation module 206 detects that no vehicle is in the first monitoring region of the blind spot monitor 184, the operation module 206 may modify an operation of the ADAS system 183 of the ego vehicle 123 to complete the lane change on the first side of the ego vehicle 123.

Example Processes

Figure 3:
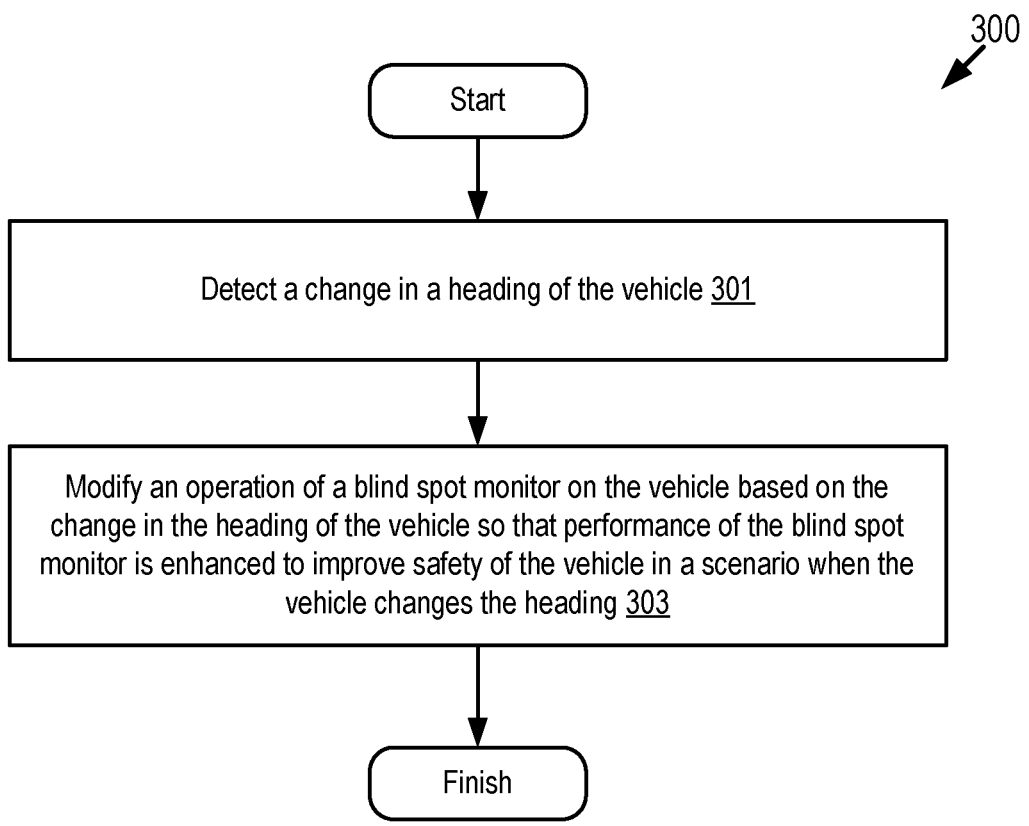
FIG. 3 depicts a method for adjusting a blind spot monitor on a vehicle to improve safety of the vehicle according to some embodiments.

Referring now to FIG. 3, depicted is a flowchart of an example method 300 for adjusting the blind spot monitor 184 on a vehicle to improve safety of the vehicle according to some embodiments. The steps of the method 300 are executable in any order, and not necessarily the order depicted in FIG. 3. The vehicle can be the ego vehicle 123.

At step 301, the heading detection module 204 detects a change in a heading of the vehicle.

At step 303, the operation module 206 modifies an operation of the blind spot monitor 184 on the vehicle based on the change in the heading of the vehicle so that performance of the blind spot monitor 184 is enhanced to improve safety of the vehicle in a scenario when the vehicle changes the heading.

Figure 4A:
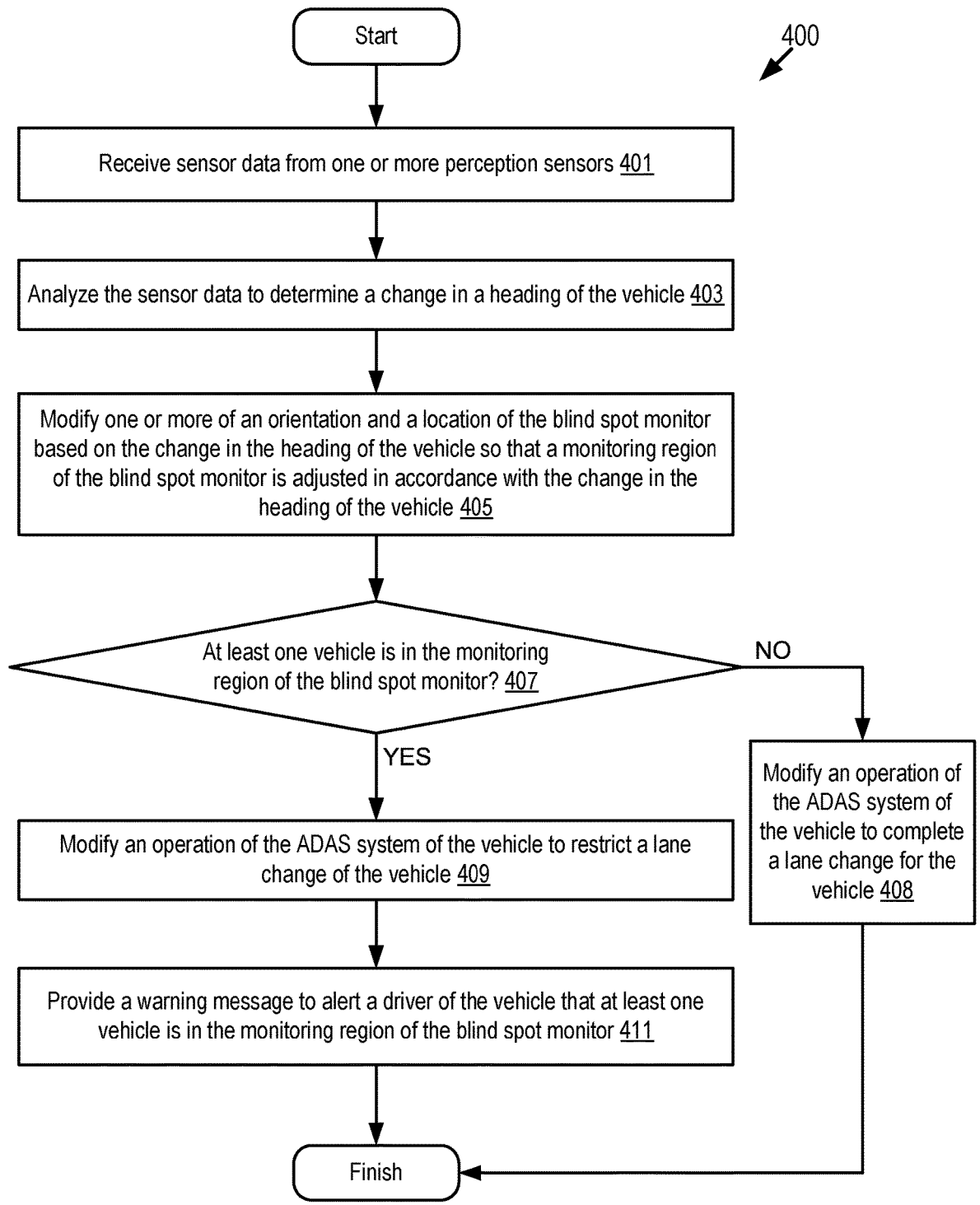
FIG. 4A depicts another method for adjusting a blind spot monitor on a vehicle to improve safety of the vehicle according to some embodiments.

FIG. 4A depicts another method 400 for adjusting the blind spot monitor 184 on a vehicle to improve safety of the vehicle according to some embodiments. The steps of the method 400 are executable in any order, and not necessarily the order depicted in FIG. 4A. The vehicle can be the ego vehicle 123.

At step 401, the heading detection module 204 receives sensor data from one or more perception sensors 181.

At step 403, the heading detection module 204 analyzes the sensor data to determine a change in a heading of the vehicle.

At step 405, the operation module 206 modifies one or more of an orientation and a location of the blind spot monitor 184 based on the change in the heading of the vehicle so that a monitoring region of the blind spot monitor 184 is adjusted in accordance with the change in the heading of the vehicle.

At step 407, after the monitoring region is adjusted, the operation module 206 determines whether there is another vehicle in the monitoring region of the blind spot monitor 184. Responsive to there being at least one vehicle in the adjusted monitoring region of the blind spot monitor 184, the method 400 moves to step 409. Otherwise, the method 400 moves to step 408.

At step 408, the operation module 206 modifies an operation of the ADAS system 183 of the vehicle to complete a lane change for the vehicle because no vehicle is in the adjusted monitoring region of the blind spot monitor 184.

At step 409, the operation module 206 modifies an operation of the ADAS system 183 of the vehicle to restrict a lane change of the vehicle because there is at least one vehicle in the adjusted monitoring region of the blind spot monitor 184.

At step 411, the operation module 206 provides a warning message to alert a driver of the vehicle that at least one vehicle is in the adjusted monitoring region of the blind spot monitor 184.

Figure 4B:
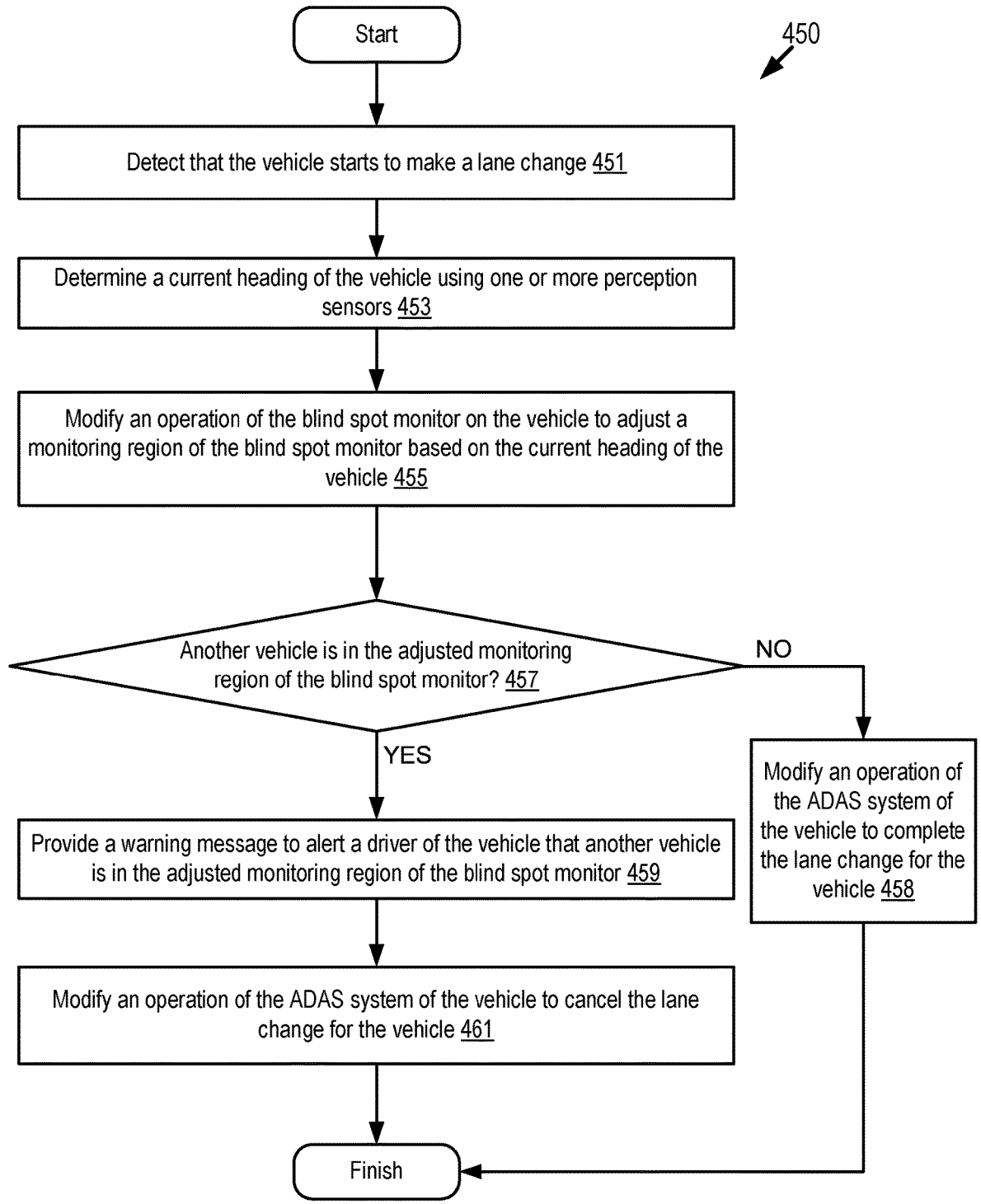
FIG. 4B depicts yet another method for adjusting a blind spot monitor on a vehicle to improve safety of the vehicle according to some embodiments.

FIG. 4B depicts yet another method 450 for adjusting the blind spot monitor 184 on a vehicle to improve safety of the vehicle according to some embodiments. The steps of the method 450 are executable in any order, and not necessarily the order depicted in FIG. 4B. The vehicle can be the ego vehicle 123.

At step 451, the heading detection module 204 detects that the vehicle starts to make a lane change.

At step 453, the heading detection module 204 determines a current heading of the vehicle using one or more perception sensors 181.

At step 455, the operation module 206 modifies an operation of the blind spot monitor 184 on the vehicle to adjust a monitoring region of the blind spot monitor 184 based on the current heading of the vehicle.

At step 457, after adjusting the monitoring region of the blind spot monitor 184, the operation module 206 determines whether there is another vehicle in the adjusted monitoring region of the blind spot monitor 184. Responsive to there being another vehicle in the adjusted monitoring region of the blind spot monitor 184, the method 450 moves to step 459. Otherwise, the method 450 moves to step 458.

At step 458, the operation module 206 modifies an operation of the ADAS system 183 of the vehicle to complete the lane change for the vehicle because there is no vehicle in the adjusted monitoring region of the blind spot monitor 184.

At step 459, the operation module 206 provides a warning message to alert a driver of the vehicle that another vehicle is in the adjusted monitoring region of the blind spot monitor 184.

At step 461, the operation module 206 modifies an operation of the ADAS system 183 of the vehicle to cancel the lane change for the vehicle because another vehicle is in the adjusted monitoring region of the blind spot monitor 184.

Figure 5A:
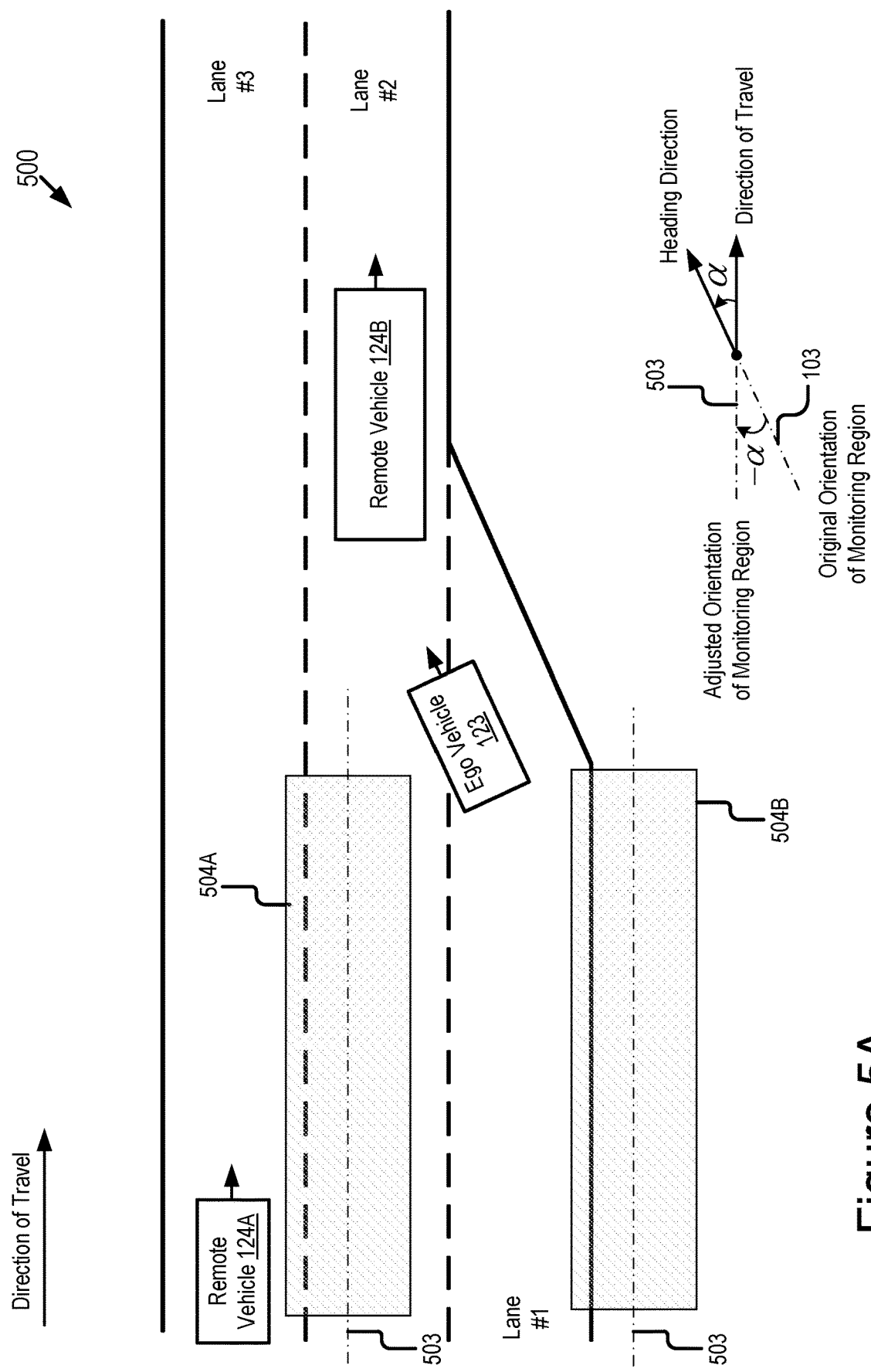
FIGS. 5A-5B are graphic representations illustrating an example use case where a blind spot monitor on a vehicle is modified to have an adjusted monitoring region according to some embodiments.
Figure 5B:
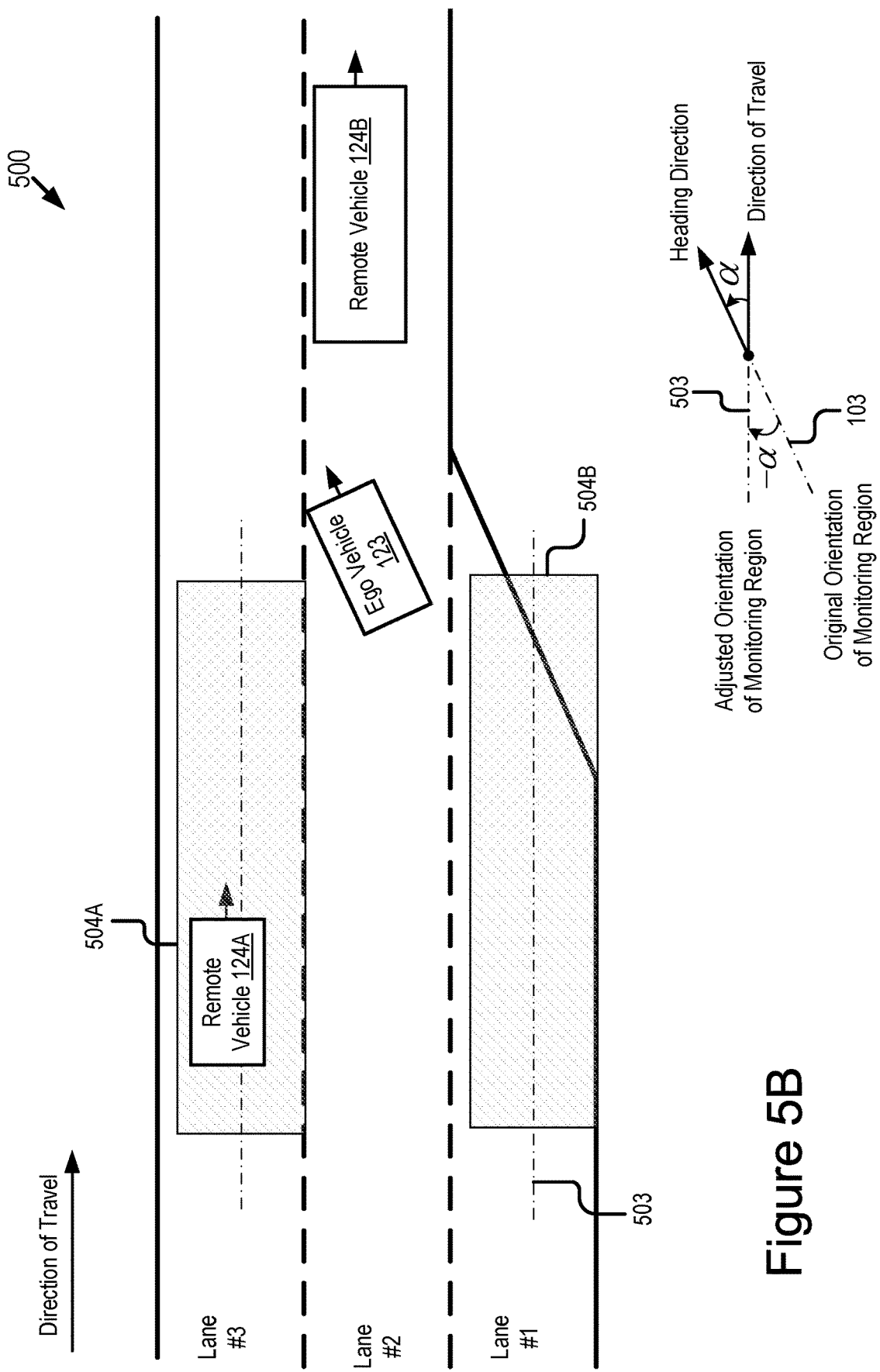

FIGS. 5A-5B are graphic representations illustrating an example use case 500 where the blind spot monitor 184 on the ego vehicle 123 is modified to have an adjusted monitoring region so that the blind spot monitor 184 continues to work optimally even when the ego vehicle 123 travels with a varying heading according to some embodiments. Here, in the example use case 500, the ego vehicle 123 makes consecutive lane changes. The monitoring region of the blind spot monitor 184 is adjusted in accordance with the change in the heading of the ego vehicle 123.

FIG. 5A is described with comparison to FIG. 1B. Referring to FIG. 5A, the ego vehicle 123 changes its heading by α degrees from the direction of travel in order to achieve a lane change from Lane #1 to Lane #2. When the ego vehicle 123 changes its heading by α degrees from the direction of travel, the operation module 206 generates modification data that may cause a rotation of the monitoring regions of the blind spot monitor 184 by −α degrees from its original monitoring regions 104A and 104B shown in FIG. 1B. Here, a counterclockwise angle change is referred to as a positive value (e.g., α degrees) while a clockwise angle change is referred to as a negative value (e.g., −α degrees). For example, adjusted monitoring regions 504A and 504B of the blind spot monitor 184 with center lines 503 are illustrated in shaded areas with an adjusted orientation that is in parallel with the direction of travel even when the ego vehicle 123 changes its heading. In this case, the adjusted orientation of the monitoring regions 504A and 504B is obtained by rotating the original orientation of the monitoring regions 104A and 104B shown in FIG. 1B by −α degrees.

FIG. 5B is described with comparison to FIG. 1C. Referring to FIG. 5B, the ego vehicle 123 continues to keep the change in its heading by α degrees from the direction of travel in order to achieve another lane change from Lane #2 to Lane #3. Of course, the ego vehicle 123 can change its heading by another angle (rather than by α degrees) from the direction of travel in order to achieve the lane change from Lane #2 to Lane #3, which is not limited thereto.

Similar to FIG. 5A, the operation module 206 generates modification data that may cause a rotation of the monitoring regions of the blind spot monitor 184 by −α degrees from its original monitoring regions 104A and 104B shown in FIG. 1C. For example, the adjusted monitoring regions 504A and 504B of the blind spot monitor 184 with the center lines 503 are illustrated with the adjusted orientation that is in parallel with the direction of travel even when the ego vehicle 123 changes its heading. In this case, the adjusted orientation of the monitoring regions 504A and 504B is obtained by rotating the original orientation of the monitoring regions 104A and 104B shown in FIG. 1C by −α degrees.

As depicted in FIG. 5B, the blind spot monitor 184 successfully detects the remote vehicle 124A in the adjacent lane "Lane #3" even if the heading of the ego vehicle 123 varies, which is different from FIG. 1C where the existing blind spot monitor fails to detect the remote vehicle 124A in the adjacent lane "Lane #3". Thus, in FIG. 5B, a potential collision between the ego vehicle 123 and the remote vehicle 124A can be avoided by canceling the lane change to Lane #3. In this case, the blind spot monitor 184 is configured to operate optimally during times when the ego vehicle 123 is traveling with a varying heading because the monitoring regions of the blind spot monitor 184 are adaptively adjusted based on the change in the heading of the ego vehicle 123.

In some embodiments, because the ego vehicle 123 only makes the left lane change in FIGS. 5A-5B, the operation module 206 may generate modification data that only adjusts the monitoring region on the left-hand side of the ego vehicle 123 while keeping the monitoring region on the right-hand side of the ego vehicle 123 unchanged. For example, with reference to FIGS. 6A-6B, the operation module 206 may generate modification data to modify the original monitoring region 104A of FIGS. 1B-1C to be the adjusted monitoring region 504A of FIGS. 6A-6B respectively while keeping the original monitoring region 104B unchanged. In this case, the blind spot monitor 184 can also keep its optimal performance during times when the ego vehicle 123 is traveling with a varying heading.

Figure 6A:
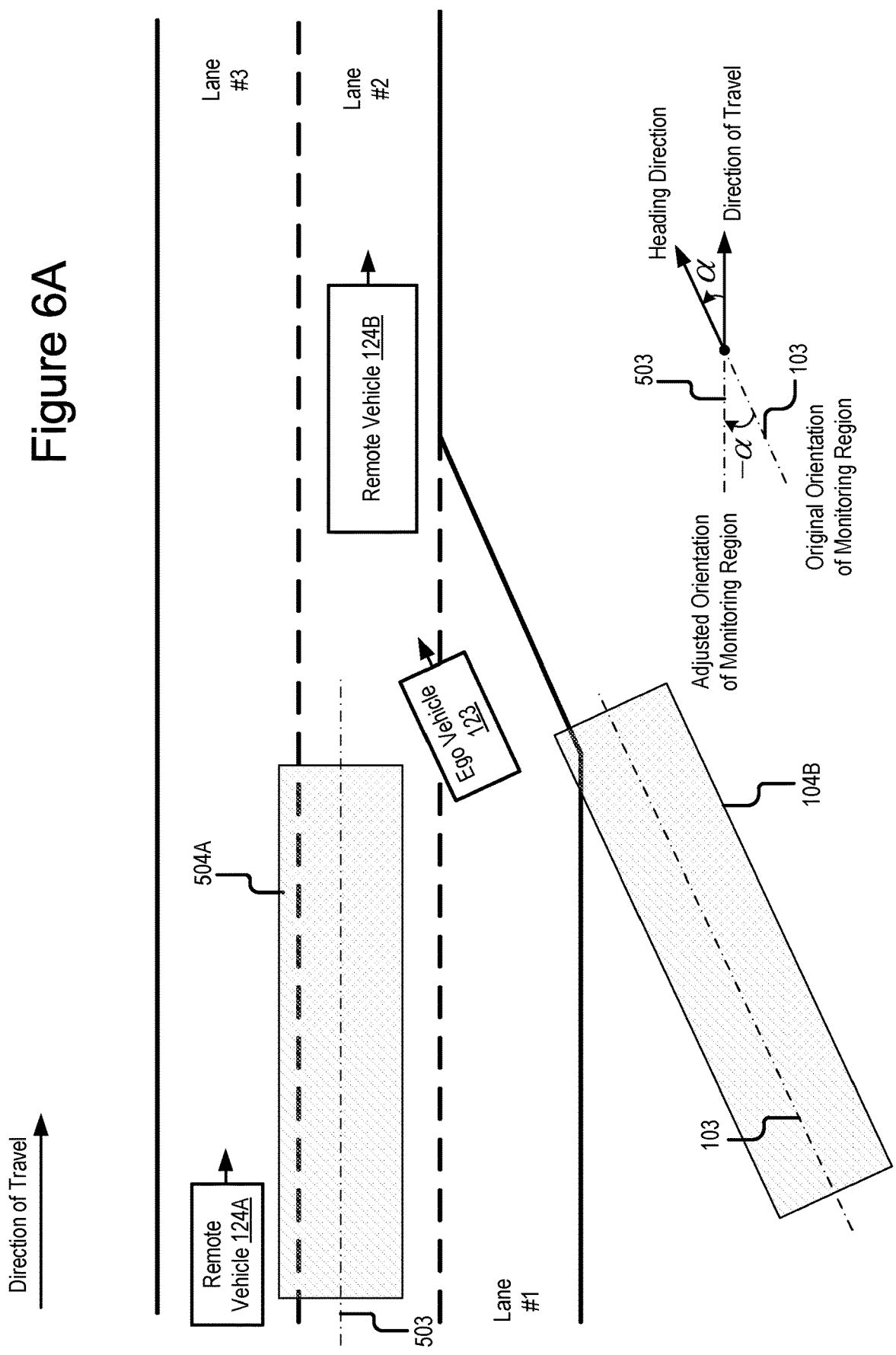

Other explanation for FIGS. 6A-6B may be referred to in FIGS. 5A-5B respectively, and similar description is not repeated here.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a vehicle, comprising:
   detecting a change of one or more degrees in a heading from a direction of travel of the vehicle; and
   modifying an orientation of a blind spot monitor on the vehicle by a negative of the one or more degrees based on the change in the heading of the vehicle so that a monitoring region of the blind spot monitor is adjusted in accordance with the change in the heading of the vehicle;

wherein performance of the blind spot monitor is enhanced to improve safety of the vehicle in a scenario when the vehicle changes the heading.

2. The method of claim 1, wherein the change of the one or more degrees in the heading of the vehicle occurs while the vehicle changes a lane.

3. The method of claim 1, wherein the blind spot monitor is adjusted by software.

4. The method of claim 1, wherein modifying the orientation of the blind spot monitor based on the change in the heading of the vehicle comprises:

determining a change in the orientation of the blind spot monitor based on the change in the heading of the vehicle; and instructing an actuator of the blind spot monitor about the change in the orientation of the blind spot monitor so that the actuator adjusts the orientation of the blind spot monitor based on the change in the orientation of the blind spot monitor.

5. The method of claim 1, further comprising:

detecting that an other vehicle is in the monitoring region of the blind spot monitor;

modifying an operation of an Advanced Driver-Assistance System (ADAS system) of the vehicle to restrict a lane change of the vehicle; and providing a warning message to alert a driver of the vehicle that the other vehicle is in the monitoring region of the blind spot monitor.

6. The method of claim 1, further comprising:

detecting that no other vehicle is in the monitoring region of the blind spot monitor; and modifying an operation of an Advanced Driver-Assistance System (ADAS system) of the vehicle to complete a lane change for the vehicle.

7. The method of claim 1, wherein detecting the change in the heading of the vehicle comprises:

receiving sensor data from one or more perception sensors; and analyzing the sensor data to determine the change in the heading of the vehicle.

8. A system comprising:

an onboard vehicle computer system of a vehicle including a non-transitory memory storing computer code which, when executed by the onboard vehicle computer system, causes the onboard vehicle computer system to:

detect a change of one or more degrees in a heading from a direction of travel of the vehicle; and modify an orientation of a blind spot monitor on the vehicle by a negative of the one or more degrees based on the change in the heading of the vehicle so that a monitoring region of the blind spot monitor is adjusted in accordance with the change in the heading of the vehicle;

wherein performance of the blind spot monitor is enhanced to improve safety of the vehicle in a scenario when the vehicle changes the heading.

9. The system of claim 8, wherein the change of the one or more degrees in the heading of the vehicle occurs while the vehicle changes a lane.

10. The system of claim 8, wherein the blind spot monitor is adjusted by software.

11. The system of claim 8, wherein the computer code, when executed by the onboard vehicle computer system, causes the onboard vehicle computer system to modify the orientation of the blind spot monitor based on the change in the heading of the vehicle at least by:

determining a change in the orientation of the blind spot monitor based on the change in the heading of the vehicle; and instructing an actuator of the blind spot monitor about the change in the orientation of the blind spot monitor so that the actuator adjusts the orientation of the blind spot monitor based on the change in the orientation of the blind spot monitor.

12. The system of claim 8, wherein the computer code, when executed by the onboard vehicle computer system, causes the onboard vehicle computer system further to:

detect that an other vehicle is in the monitoring region of the blind spot monitor;

modify an operation of an Advanced Driver-Assistance System (ADAS system) of the vehicle to restrict a lane change of the vehicle; and provide a warning message to alert a driver of the vehicle that the other vehicle is in the monitoring region of the blind spot monitor.

13. The system of claim 8, wherein the computer code, when executed by the onboard vehicle computer system, causes the onboard vehicle computer system further to:

detect that no other vehicle is in the monitoring region of the blind spot monitor; and modify an operation of an Advanced Driver-Assistance System (ADAS system) of the vehicle to complete a lane change for the vehicle.

14. The system of claim 8, wherein the computer code, when executed by the onboard vehicle computer system, causes the onboard vehicle computer system to detect the change in the heading of the vehicle at least by:

receiving sensor data from one or more perception sensors; and analyzing the sensor data to determine the change in the heading of the vehicle.

15. A computer program product comprising a non-transitory memory of an onboard vehicle computer system of a vehicle storing computer-executable code that, when executed by a processor, causes the processor to:

detect a change of one or more degrees in a heading from a direction of travel of the vehicle; and modify an orientation of a blind spot monitor on the vehicle by a negative of the one or more degrees based on the change in the heading of the vehicle so that a monitoring region of the blind spot monitor is adjusted in accordance with the change in the heading of the vehicle;

wherein performance of the blind spot monitor is enhanced to improve safety of the vehicle in a scenario when the vehicle changes the heading.

16. The computer program product of claim 15, wherein the change of the one or more degrees in the heading of the vehicle occurs while the vehicle changes a lane.

17. The computer program product of claim 15, wherein the blind spot monitor is adjusted by software.

18. The computer program product of claim 15, wherein the computer-executable code, when executed by the processor, causes the processor to modify the orientation of the blind spot monitor based on the change in the heading of the vehicle at least by:

determining a change in the orientation of the blind spot monitor based on the change in the heading of the vehicle; and instructing an actuator of the blind spot monitor about the change in the orientation of the blind spot monitor so that the actuator adjusts the orientation of the blind spot monitor based on the change in the orientation of the blind spot monitor.

19. The computer program product of claim 15, wherein the computer-executable code, when executed by the processor, causes the processor further to:

detect that an other vehicle is in the monitoring region of the blind spot monitor;

modify an operation of an Advanced Driver-Assistance System (ADAS system) of the vehicle to restrict a lane change of the vehicle; and provide a warning message to alert a driver of the vehicle that the other vehicle is in the monitoring region of the blind spot monitor.

20. The computer program product of claim 15, wherein the computer-executable code, when executed by the processor, causes the processor further to:

detect that no vehicle is in the monitoring region of the blind spot monitor; and modify an operation of an Advanced Driver-Assistance System (ADAS system) of the vehicle to complete a lane change for the vehicle.

* * * * *